A. B. EDMANDS.

KNOT TYING DEVICE.

APPLICATION FILED AUG. 2, 1916.

Reissued July 29, 1919.

14,697.

2 SHEETS—SHEET 1.

Fig. 3½

Inventor:
Artemas B. Edmands.
by Emery, Booth, Varney & Kemp
Attys.

A. B. EDMANDS.
KNOT TYING DEVICE.
APPLICATION FILED AUG. 2, 1916.
Reissued July 29, 1919.
14,697.
2 SHEETS—SHEET 2.
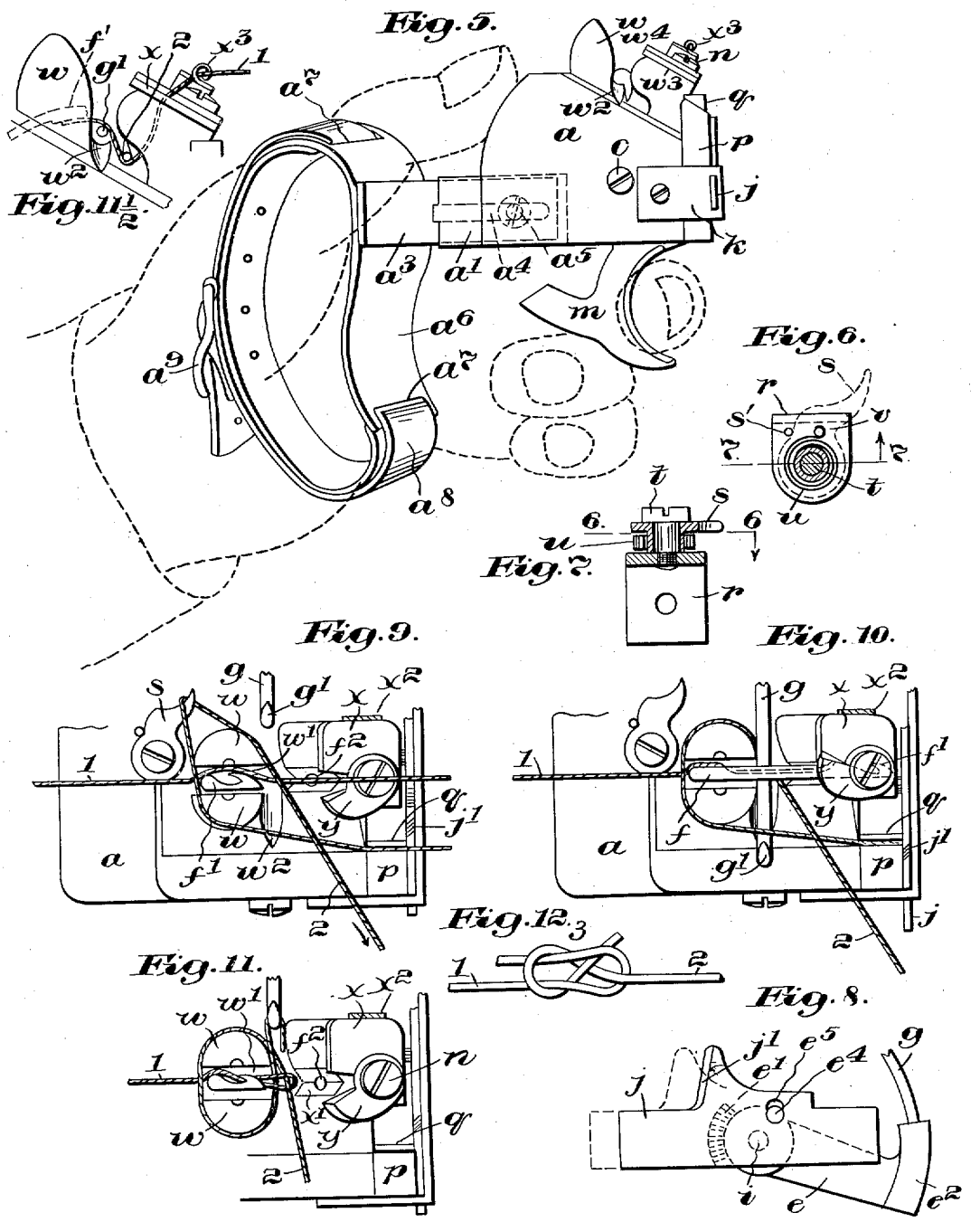
Inventor:
Artemas B. Edmands.
by Emery Booth Jenney & Young
Attys.

UNITED STATES PATENT OFFICE.

ARTEMAS B. EDMANDS, OF PAWTUCKET, RHODE ISLAND.

KNOT-TYING DEVICE.

14,697. Specification of Reissued Letters Patent. Reissued July 29, 1919.

Original No. 1,112,367, dated September 29, 1914, Serial No. 765,463, filed May 5, 1913. Application for reissue filed August 2, 1916. Serial No. 112,855.

*To all whom it may concern:*

Be it known that I, ARTEMAS B. EDMANDS, a citizen of the United States, residing at Pawtucket, in the county of Providence and State of Rhode Island, and formerly residing at Milford, in the county of Worcester and State of Massachusetts, have invented certain new and useful Improvements in Knot-Tying Devices, of which the following is a specification.

My present invention relates to improvements in knot-tying devices, and the purpose of my invention is to provide a mechanism, by which the loose ends of the thread may be cut off neatly, and of approximately the same length, and a weaver's knot quickly and accurately tied.

I accomplish these results by the mechanism shown in the accompanying drawings, in which—

Figure 1:
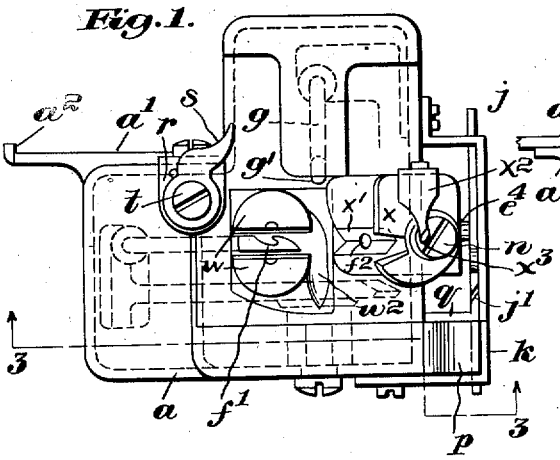
Figure 2:
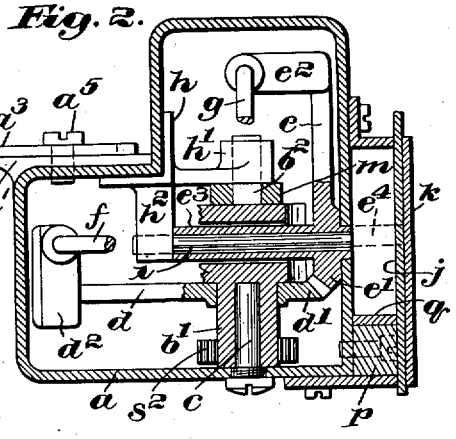
Figure 3:
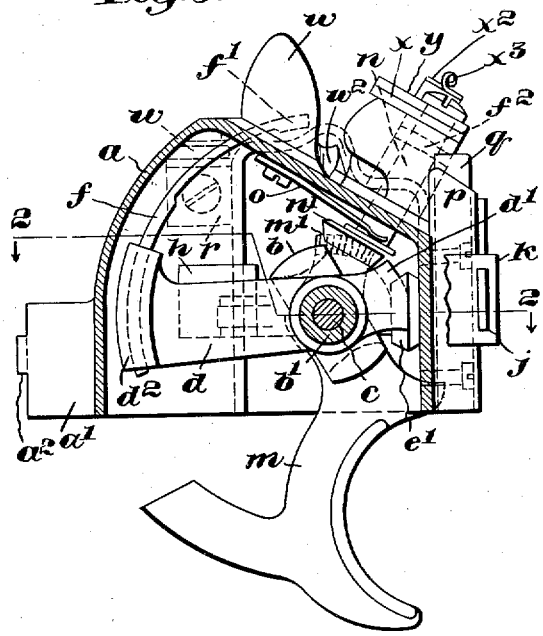
Figure 4:
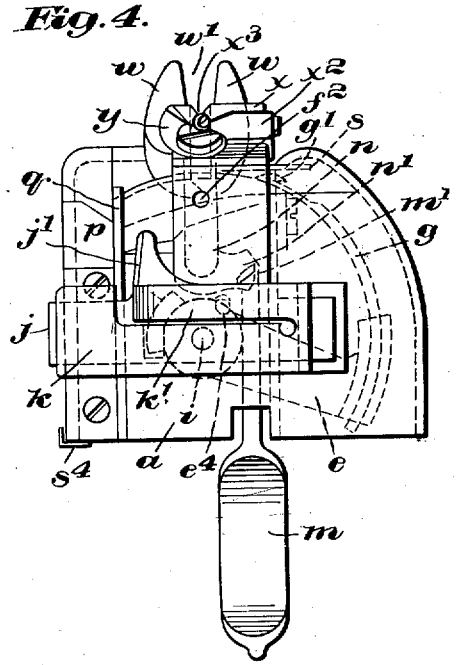
Figure 4:
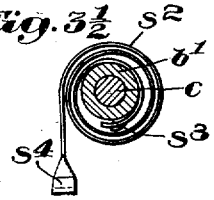

Figure 1 is a view of my device looked at from above;

Fig. 2 a sectional view through the plane 2—2 of Fig. 3;

Fig. 3 is a vertical section through the plane 3—3 of Fig. 1;

Fig. 3½ the spring which restores the trigger and hook needles to their original position after the trigger has been pulled;

Fig. 4 an end elevation;

Fig. 5 a side elevation showing how the mechanism is held by the hand;

Fig. 6 a section of the spring actuated thread guide on plane 6—6 of Fig. 7;

Fig. 7 a sectional view of the same on the plane 7—7 of Fig. 6;

Fig. 8 a detailed drawing of a part of the cutting-off mechanism and a portion of one hook needle;

Fig. 9 a top view of a portion of my invention, showing the hook needles, the operation of the thread guide, the cutting off mechanism and the respective positions of the threads just before the thread is detached from the guide;

Fig. 10 a view of the same at a later period of the tying operation;

Fig. 11 the arrangement of the thread just before the knot is drawn tightly, showing the method of looping the thread;

Fig. 11½ the method by which the hook needle $f'$ holds one end of the thread 1; and Fig. 12 shows the completed knot before tightening.

The various parts of the mechanism are indicated by the same letters throughout the several views.

My invention is designed to be held closely in the left hand of the operator, and it embodies substantially features for guiding and locating in their proper positions with reference to each other the two threads to be tied; two hook needles operating in planes preferably at right angles to each other and in fixed relation to each other and to the members of the thread and adapted by manipulation of the trigger to catch and put the threads into proper relation for the tying of the knot; and two thread cutters for cutting off the ends of the thread.

In the several figures $a$ represents the body or framework of a hollow box or casing, approximately rectangular in horizontal section and having a lateral projection as seen at the top of the drawings in Figs. 1 and 2.

$a'$ is a flange, or projection from one side of the case $a$, serving as a seat for the member $a^3$ to which is affixed a handle $a^6$ seen best in Fig. 5, provided with slots $a^7$—$a^7$ for the reception of a strap and buckle $a^8$—$a^9$ adapted to secure the device upon the hand of the operator. The member $a^3$ is adjustable upon $a'$ by means of a slot $a^4$, and the screw $a^5$. The bend $a^2$ seen in Fig. 1 limits the movement of $a^3$.

Upon the interior of the case $a$, and at the interior angle formed by the lateral projection above mentioned, is the angular member $h$, Fig. 2, having the support $h'$ which carries the stud $b^2$ supporting the shaft $b'$ and also forms the support $h^2$ of the stud $i$ supporting the shaft $e^3$, these two shafts $b'$ and $e^3$ being at right angles to each other. The shaft $b'$ is supported by the stud or screw $c$ at the outer end and by the similar stud $b^2$ at the inner end, and the shaft $e^3$ is supported by the stud $i$; the shaft $b'$ is revolubly mounted on the stud $b^2$ and the pin $c$, and this shaft $b'$ has fixed upon it the member $d$—$d'$ and the member $m'$, which shaft and members are herein shown as all integral with and operated by the trigger $m$, best seen in Fig. 3. The member $d$—$d'$ consists substantially of a longitudinal piece of metal terminating at one end in a receptacle $d^2$ for the hook needle $f$—$f'$, and at the opposite extremity in the piece $d'$ which is upon one face made a segment of a beveled gear. The shaft $e^3$ is revolubly mounted by means of the pin $i$ fixed in the member $h^2$ at one end, and projects through and is supported by the case $a$ at the other end, as shown in Fig. 2.

Preferably integral with the shaft $e^3$ and forming a portion of it is the segmental beveled gear $e'$ in mesh with the beveled gear $d'$; and forming also a part of the shaft $e^3$ and preferably integral therewith is the arm $e$, having at its extremity the projection $e^2$ serving as a receptacle or holder for the other hook needle $g$, the arm $e$ and the arm $d$ being substantially counter-parts of each other and operating simultaneously in planes at right angles to each other by means of the beveled gears $d'$—$e'$. The two shafts $e^3$ and $b'$ with their connected beveled gears and hook needle carriers are operated by the trigger $m$ of Fig. 3, which is integral with the shaft $b'$ as above stated.

The gear $d'$ is about two-fifths larger pitch diameter than the gear $e'$ so that the hook needle $g$ will have a somewhat longer travel than the needle $f$.

$m'$ is a segmental beveled gear which meshes with a similar segmental gear $n'$ fixed upon the revoluble stud $n$, a vertical view of which is seen in dotted lines in Fig. 4. It will thus be seen that when the trigger $m$ is pulled, the beveled gears $e'$—$d'$ are brought into operation, each carrying its respective hook needle and at the same time the beveled gears $m'$—$n'$ act to rotate the stud $n$ as above stated. The trigger $m$ and its connected parts are restored to their normal position by the coiled spring $S^2$ of Fig. 3½, this spring being fixed to the shaft $b'$ by the tongue $S^3$ and having its other end $S^4$ anchored to the frame, as seen in Fig. 4.

$x$, seen best in Figs. 1 and 9, is a stationary shear blade fixed upon the frame of the device and $y$ is a movable blade, the two serving for cutting off the thread 1 before the knot has been tied, as hereinafter set forth. The blade $y$ is fixed upon and operated by the stud $n$ which is itself operated by the beveled gears $m'$—$n'$, above described.

It will be noted that the stud $n$ which carries the blade $y$ of the upper pair of shears is held firmly down by means of the spring $o$ seen best in Fig. 3, which spring bears against the upper face of the gear $n'$, Figs. 3 and 4, thus holding the blade $y$ firmly against its opposing blade $x$.

$w^3$ seen in Fig. 5 is a projection from the top of the device, and carries the stud $n$ and the shears $x$—$y$, and between this projection and the posts $w$—$w$, there is a space or opening $w^4$ at the bottom of which is a groove or channel $w^2$ for one of the threads and its needle, as seen best in Figs. 1 and 4, while $x'$, Figs. 1 and 11, is a similar groove for the other thread and its needle. It will be noted in Figs. 3 and 4, that the stud $n$ is perforated with the hole $f^2$. This permits the hook needle $f'$ to pass entirely through it when the trigger $m$ is pulled back to its limit, and as the perforation $f^2$ is made considerably larger than the hook needle $f'$, there is no interference with the operation of the blade $y$, as the throw or travel of $y$ is itself very limited.

The end of the other thread 2 before the knot is tied is cut by the shears $j'$—$p$ shown best in Fig. 4, $p$ being the stationary blade and $j'$ the movable blade thereof. This movable blade $j'$ is fixed upon the member $j$ and slides within the plate $k$ which is itself fastened to the frame of the knot tier, and this blade $j'$ is seen best in Fig. 8, which figure also discloses its method of operation. Fixed upon the beveled gear $e'$ which forms part of the needle carrier $e$, and a little off the center on which said beveled gear revolves, is a pin or stud $e^4$, seen also in Figs. 1 and 2, which pin engages the slot $e^5$ in the member $j$ and a partial revolution of the beveled gear $e'$ causes the member $j$ with the blade $j'$ to travel forward sufficiently to shear off the projecting end of the thread by means of the blade $p$ and $j'$. The position of the thread just before shearing is shown in Fig. 9 and just after pulling the trigger is shown in Fig. 10.

The plate $k$ which retains in place the member $j$ with its connected blade $j'$ is split longitudinally, as shown in Fig. 4, and the r mber $k'$ above the split is bent inward so as to force it by a spring engagement closely against the blade $p$ so as to insure a clean cut.

$w$—$w$ are posts rounded on their outer faces, and having a space $w'$ between them for the passage of the hook needle $f'$ and the reception of one of the threads, and together serve as a thread holder, as seen best in Figs. 9, 10 and 11.

The member $s$, Figs. 6 and 7, serves as a thread guide operating to insure the proper placing of the thread for its engagement by the hook needle. The member $s$ is mounted so as to rock upon the stud $t$, and has a spring $u$ to bring it back into the position from which it has been moved by the tension of the thread in the proper placing of the same before tying the knot. The backward motion of $s$ is limited by the stud $s'$.

$x^2$—$x^3$, Figs. 1, 3 and 4, is an eyelet fastened by the flat shank $x^2$ to the side of the projection $w^3$ and serves to hold the thread 1 in proper relation to the shears $x$—$y$. This eyelet is for the sake of clearness, omitted from Figs. 9, 10 and 11.

$q$ seen best in Figs. 3 and 4, is a spring clamp fastened to the bottom of stationary blade $p$ of Figs. 1 and 2, and having its upper end projecting above said blade, as shown in Fig. 3. The upper end of the blade $p$, Fig. 4, has its corner cut away at the inner portion, adjacent to the face of $q$, so as to facilitate the admission of one of the threads, as explained later. This plate $q$ is secured to $p$ at its lower end so that it has a spring contact at the upper end with the stationary blade $p$, thus forming a clamp serving to hold the thread 2 at proper tension as seen in Figs. 9 and 10.

Attention is called to the fact that the under or concave surface of the needle $f$ is cut away, as shown in Fig. 3 and also in Fig. 11½ excepting at the upper end $f'$ of the needle. This cut away space and full sized end $f'$ serves a very important function in holding the thread 1 when the loop is formed and before it is drawn tight and away from the knot tying device, as will be shown hereafter.

The operation of my invention is as follows, and can be seen best by an inspection of Figs. 9, 10, 11 and 12. The device is held in the left hand, the hand going through the strap $a^8$—$a^9$, the index or middle finger being in engagement with the trigger $m$ and the thumb resting upon the upper portion of the knot tier and holding the thread 1. One end of the thread 1 is then passed through the space $w'$ and thence through the guide loop $x^3$ above the shears $x$—$y$. The other thread 2 is drawn by the right hand between the clamp $q$ and the stationary blade $p$ and thence around the posts $w$—$w$ over the spring guide $s$, thence through the space $w^4$ and over the thread 1, the outer portion of the thread 2 being held in the right hand; the thread 2 is then drawn somewhat tightly by the right hand, forcing forward the spring guide $s$ until the thread 2 slips off and $s$ assumes its original position, as shown in Fig. 9 leaving the thread lying close to and around the base of the posts $w$—$w$. When this position is reached, the trigger $m$ is pulled by the middle finger of the left hand, the two hook needles $f'$—$g'$ are thus brought forward, $g'$ crossing over the outer or loose end of the thread 2, Fig. 10, and under the thread 1, and also under that portion of 2 lying between the posts $w$—$w$ and the clamp $q$. The pulling of the trigger $m$ cuts off the thread 1 by the shears $x$—$y$ also the thread 2 by the shear $j'$—$p$.

The relative position of the threads just before the trigger is released is shown in Figs. 10 and 11½. The needle $f$—$f'$ as it comes forward forces by reason of the shape of the head $f'$ the thread 1 to one side, as shown in Fig. 10 and as the needle point $f'$ advances it passes over the thread 1 as indicated by the dotted lines in Fig. 10. As soon as the threads have been cut off by the shears as above stated, the trigger is released and the needles $g$—$g'$ and $f$—$f'$ return to their original position by means of the spring $s^2$.

As it is important that the main portion of the thread 1 should not be disturbed by the return of the needle $f$—$f'$ until the outer end of 1 is caught by the hook $f'$, I have provided a clearance for the main portion of the thread by cutting away the under portion of the needle $f$—$f'$, as shown in Figs. 3 and 11½. As the needle $g$—$g'$ returns toward its original position it catches on its return path, first, that portion of the thread 2 which lies directly between the clamp $q$ and the posts $w$—$w$, and draws it backward in a loop as shown in Fig. 11. At the same time the needle $f$—$f'$ in its return catches with its hook the end of the thread 1 adjacent to the shears $x$—$y$ and brings it back over the outer end of the thread 2 which is held by the right hand of the operator, the relative positions of the thread then being as shown in Fig. 11.

Fig. 11½ also shows that that portion of the thread 1 lying immediately below the shears $x$—$y$ is almost perpendicular thereto, so that the side barb of the needle $f$—$f'$ readily grasps it and draws it backward into the position shown in Fig. 11. It will also be seen in Fig. 11½ that the head or extremity of the needle $f$—$f'$ being of full size, serves to hold securely the end looped thread 1 as the needle $f$—$f'$ returns to its original position and is stationary, so that the thread 1 is clamped by the head $f'$ of the needle $f$—$f'$ against the underlying part of the body of framework at the point shown in Fig. 11½, until the thread 2 is pulled from the posts $w$—$w$ in the final tightening of the knot.

The threads being in the relative position shown in Fig. 11, a slight pull of the right hand upon the thread 2 slides the loop of the thread 2 off from the posts $w$—$w$ and leaves the ends in the relative positions shown in Fig. 12, the knot being then completed by pulling the thread 2 tighter by means of the right hand of the operator, the thread 1 being retained by the thumb of the left hand.

Having now described one illustrative embodiment of my invention, I desire it to be understood that although specific terms are employed, they are used in a generic and descriptive sense and not for purposes of limitation, the scope of the invention being set forth in the following claims.

Claims:

1. In a knot tying device, a containing frame work, a trigger shaft revolubly mounted therein, a second shaft also revolubly mounted therein at right angles to said trigger shaft, two needle carrying arms, the one integral with said trigger shaft, the other integral with said second shaft and operating in planes at right angles to each other, two hook needles fixed one upon each of said arms, a reciprocating trigger fixed upon said trigger shaft, bevel gears fixed one upon the inner end of each of said needle carrying arms and in mesh with each other, a spring operating to return said trigger and said needle arms and needles to their normal position when said trigger is released, and means for arranging the threads in such a position with reference to each other and to said needles that said threads will be drawn by engagement with said needles into a weaver's knot.

2. In a knot tying device, a containing frame work, a trigger shaft revolubly mounted therein, a second shaft also revolubly mounted therein at right angles to said trigger shaft, two needle carrying arms, the one integral with said trigger shaft, the other integral with said second shaft, and operating in planes at right angles to each other, two hook needles fixed one upon each of said arms, a reciprocating trigger fixed upon said trigger shaft, bevel gears, one upon the inner end of each of said needle carrying arms and in mesh with each other, a spring operating to return said trigger and said needle arms and needles to their normal position when said trigger is released, guides for placing the threads in proper relation to each other for the formation of a weaver's knot by the engagement therewith of said needles, and separate shears mounted upon said containing frame work and operated by said trigger, and serving to cut said threads to a proper length.

3. In a knot tying device, a containing frame work, a trigger shaft revolubly mounted therein, a second shaft also revolubly mounted therein at right angles to said trigger shaft, two needle carrying arms, the one integral with said trigger shaft, the other integral with said second shaft and operating in planes at right angles to each other, two hook needles fixed one upon each of said arms, a reciprocating trigger fixed upon said trigger shaft, bevel gears, one upon the inner end of each of said needle carrying arms and in mesh with each other, a spring operating to return said trigger and said needle arms and needles to their normal position when said trigger is released, two posts adapted to form a loop in one thread and having a space between them for the reception of the second thread, a thread guide operating to place said second thread in proper relation to said first thread for the formation of a weaver's knot and an eyelet serving to hold said first thread in position.

4. A knot tying device comprising a frame, two hook needles revolubly mounted therein and moving in planes at right angles to each other, one of said needles moving in the arc of a circle and being of full size at its free end and having a portion of its concaved surface cut away to form a clearance for the thread to be engaged by said needle and its free end being adapted to hold said thread for maintaining proper relations to a second thread for the formation of a weaver's knot journaling means for said needles positioned transversely of and perpendicular to each other, and means for operating said needles.

5. In a knot tying device, two revolubly mounted hook needles adapted for movement in planes at right angles to each other, one of said needles being of full size at its free end and having a portion of its concaved surface cut away to form a clearance for the thread to be engaged by said needle and the free end of said needle adapted to hold said thread for maintaining the proper relations to a second thread for the formation of a weaver's knot, journaling means for said needles, one of said journaling means being positioned transversely through the other journaling means.

6. A knot tying device comprising in combination, a trigger shaft having a trigger, a second shaft at an angle thereto, a needle carried by each shaft, operating connections between said shafts, and means to return said trigger and its shaft.

7. A knot tying device comprising in combination, a trigger shaft having a trigger, a second shaft at an angle thereto, a needle carried by each shaft, operating connections between said shafts, means to return said trigger and its shaft, and co-acting guides for two threads so that the needles effect in operation the formation of a weaver's knot.

8. A knot tying device comprising in combination, two shafts mounted for oscillatory movement, a needle carried by each shaft, inter-connecting means between said shafts, means upon one of said shafts constituting the initial power receiving member and to which the power is directly and initially applied, thereby to rock both of said shafts and to move the needles carried thereby bodily toward each other, and co-acting guides for the two threads so that the needles effect in operation the formation of a weaver's knot.

9. A knot tying device comprising in combination, two shafts, a needle carried by each shaft, means upon one of said shafts and constituting the initial power receiving member and to which the power is directly and initially applied to move said shafts, gearing connecting said shafts and adapted positively to move said needles in one direction, and co-acting means for the two threads so that the needles effect in operation the formation of a weaver's knot.

10. A knot tying device composed of two shafts mounted for rocking movement, a needle carried by each shaft, interconnecting means between said shafts to move said needles toward each other, and a guide around which one of the threads is wrapped in a bight prior to the needle manipulation thereof, and from which guide both portions of said thread extend away to the same side of the device with respect to said guide being so positioned that both the needles in their movement approach said guide and effect the tying of the knot in close proximity thereto.

11. A knot tying device composed of two shafts mounted for rocking movement in intersecting planes, a needle carried by each shaft, interconnecting means between said shafts to move said needles toward each other, a guide positioned substantially at the point of knot formation and about which one of the threads is wrapped in a bight prior to the needle manipulation thereof, and from which guide both portions of said thread extend away to the same side of the device with respect to the said guide and co-acting means for the two threads, so that the needles effect in operation the formation of a weaver's knot substantially at said guide.

12. A knot tying device comprising in combination, two needles, means to operate them to tie a knot, and a guide about which one of the threads may be wrapped prior to the needle manipulation thereof and through which guide one of the needles moves in operation.

13. A knot tying device comprising in combination, two shafts, a needle carried by each shaft, means operatively connecting said shafts, and a guide about which one of the threads may be wrapped prior to the needle manipulation thereof, and through which one needle and alongside which the other needle move in operation.

14. A knot tying device comprising in combination, two shafts, a needle carried by each shaft, means operatively connecting said shafts, a guide about which one of the threads may be wrapped prior to the needle manipulation thereof, and through which one needle, and alongside which the other needle move in operation, and co-acting guides for the two threads so that the needles effect in operation the formation of a weaver's knot.

15. A knot tying device comprising in combination, two shafts, a needle carried by each shaft, means operatively connecting said shafts, and a guide composed of spaced members about which one of the threads may be wrapped prior to the needle manipulation thereof, one of said needles being positioned for movement between the members of said guide.

16. A knot tying device comprising in combination, two shafts mounted for rocking movement, a needle carried by each shaft, means operatively connecting said shafts to move said needles toward each other, a guide about which one of the threads is adapted to be wrapped in a bight prior to needle manipulation thereof, said guide being so positioned that both the needles in their movement approach said guide, and a yielding guide *s* co-acting with said first mentioned guide and from which yielding guide the said thread slips into a bight about said first-mentioned guide.

17. A knot tying device comprising in combination, two shafts mounted for rocking movement, a needle carried by each shaft, interconnecting means between said shafts to move said needles toward each other in intersecting planes, a guide about which one of the threads is adapted to be passed in a bight prior to the needle manipulation thereof and from which both of the portions of said thread extend away in the same general direction, said guide being so positioned that both the needles in their movement approach thereto, co-acting guides for the two threads, so that the needles effect in operation the formation of a weaver's knot, and means to sever the thread ends.

18. A knot tying device comprising in combination, two shafts mounted for rocking movement, a needle carried by each shaft, bevel gears operatively connecting said shafts to move said needles toward each other, and a guide about which one of the threads is wrapped in a bight prior to the needle manipulation thereof, and from which guide both portions of said thread extend away in the same general direction, said guide being so positioned that both the needles in their movement approach said guide, and means to sever the thread ends.

19. A knot tying device comprising in combination, two shafts mounted for rocking movement, a needle carried by each shaft, a guide *w* and a co-acting yielding guide *s* about both of which one of the threads is wrapped in a single bight prior to needle manipulation thereof, means operatively connecting said shafts to move said needles toward each other, and means to sever the thread ends.

20. A knot tying device comprising in combination, two shafts, a needle carried by each shaft, means upon one of said shafts to apply power directly to said shafts, said means constituting the initial power receiving member to which power is directly and initially applied, interconnecting means between said shafts, and co-acting guiding means for the threads, so that the needles effect in operation the formation of a weaver's knot.

21. A knot tying device comprising in combination, two shafts, a needle carried by each shaft, means to apply power directly to one shaft, interconnecting means between said shafts, and means co-acting with one of said needles and against which said needle clamps its thread end.

22. A knot tying device composed of two shafts mounted for rocking movement, a needle carried by each of said shafts, interconnecting means between said shafts to rock said needles toward each other in intersecting planes, a housing inclosing said shafts, needles and interconnecting means, and co-acting guides for the two threads so that the needles effect in operation the formation of a weaver's knot.

23. A knot tying device comprising in combination, a casing or housing, two shafts, interconnecting means therefor, and a needle carried by each shaft, said shafts and needles being mounted within said casing and the needles extending therethrough to the upper face and so positioned that upon actuation of said shafts the needles are guidingly moved on the upper face of the casing or housing and there effect the tying of the knot.

24. A knot tying device comprising in combination, a support for two threads, two shafts, interconnecting means therefor, a needel carried by each shaft, a guide about which one of the threads is wrapped in a bight prior to thread manipulation, means to operate said shafts to cause said needles to cross each other in operation and including means to cause one of said needles to move alongside said bight and take the thread wherein the bight is formed.

25. A knot tying device composed of two shafts mounted for rocking movement, a needle carried by each shaft, interconnecting means for said shafts to rock said needles toward each other, with the active ends moving in paths lying in intersecting planes, and operating means for said shafts simultaneouly to move said needles in said paths.

26. A knot tying device composed of two shafts mounted for rocking movement, interconnecting means therefor, a needle carried by each shaft, means to operate said shafts to cause the active ends of said needles to rock in paths lying in intersecting planes and to cross each other in operation, and co-acting guiding means for the two threads so that the needles effect in operation the formation of a weaver's knot.

27. A knot tying device composed of two shafts mounted for rocking movement, means to apply power directly to one shaft, interconnecting means between the shafts and a needle carried by each shaft, the active ends of said needles being movable thereby in substantially straight paths lying in intersecting planes, said shafts being arranged at substantially right angles whereby the needles are rocked to cross each other in operation.

28. A knot tying device comprising in combination, two shafts mounted for rocking movement, means to apply power directly to one shaft, interconnecting means between the shafts and a needle carried by each shaft, said shafts being arranged at substantially right angles whereby the needles are moved to and fro and cross each other in operation and each needle moves its thread across the path of the other needle and the other thread, and a guide about which one of the threads is wrapped in a bight prior to needle manipulation, said guide being so located that one of the needles moves alongside said bight to seize the thread wherein it is formed and the knot is tied in close proximity to said guide.

29. A knot tying device comprising in combination, two shafts, means to apply power directly to one shaft, interconnecting means between the shafts and a needle carried by each shaft, said shafts being arranged at substantially right angles whereby the needles are moved to cross each other in operation, and a guide composed of divided members about which one of the threads may be wrapped prior to needle manipulation, one of said needles being movable between the members of said guide.

30. A knot tying device comprising in combination, two shafts, said shafts having directly meshing gears, and a needle carried by each shaft, and means for applying power whereby when actuated both shafts swing together and the needles move in intersecting planes.

31. A knot tying device comprising in combination, two shafts, said shafts having directly meshing gears, and a needle carried by each shaft, and means to apply power directly to one of said shafts, whereby said shafts when actuated rock simultaneously, and their needles are moved to cross each other in operation.

32. A knot tying device comprising in combination, two shafts, interconnecting means therebetween, a needle carried by each shaft, and co-acting guiding means for the two threads, so that the needles effect in operation the formation of a weaver's knot, and means co-acting with one of said needles to clamp its thread end during the tightening thereof.

33. A knot tying device comprising in combination, a shaft $i$, a shaft $b'$, hooked needles $g$ and $f$ carried thereby, gears $d'$, $e'$ connecting said shafts, trigger means $m$ to apply power directly to the shaft $b'$, and cooperating means to return said shafts to normal position.

34. A knot tying device comprising in combination, two shafts, a needle carried by each shaft, means operatively connecting said shafts, and means against which one of the needles clamps its thread end.

35. A knot tying device comprising in combination, two knot tying needles, operating means therefor, coöperating guiding means for the threads, so that the needles effect in operation the formation of a weaver's knot, and means against which one of the needles clamps its thread end.

36. A knot tying device composed of two shafts, interconnecting means therefor, a needle carried by each shaft, means whereby a bight may be formed in one thread prior to needle manipulation, and means to operate said shafts to cause said needles to move to and fro and cross each other in operation, whereby each needle draws its thread across the path of the other needle and across the other thread and including means whereby one needle is moved alongside of and the other needle is moved through said bight to grasp the respective threads.

37. A knot tying device comprising in combination, a plurality of knot tying needles, means to operate the same to tie a weaver's knot, and means coöperating with a needle of said plurality of needles to clamp its thread end during tightening of the knot.

38. A knot tying device comprising in combination, knot tying means, including a pair of needles, supporting shafts therefor, and means against which a thread is clamped by a needle of said knot tying means during the tightening of the knot.

39. A knot tying device comprising in combination, knot tying means including a pair of needles, and means against which one of said needles clamps its thread end during the tightening of the knot.

40. A knot tying device comprising in combination, two needles, means to operate the same to tie a knot, and a guide composed of spaced members about which one of the threads may be wrapped prior to the needle manipulation thereof, one of said needles being positioned for movement between the members of said guide.

41. A knot tying device comprising in combination, two needles, means to operate the same to tie a knot, and a guide composed of spaced members about which one of the threads may be wrapped in effecting the tying of the knot, one of said needles being positioned for movement between the members of said guide.

42. A knot tying device comprising in combination, two shafts, beveled gears connecting said shafts, a needle carried by each shaft, and means for applying power to the device to operate said needles.

43. A knot tying device comprising in combination, two shafts mounted at substantially right angles to each other, a needle carried by each shaft, toothed gears upon said shafts and meshing with each other, whereby the needles are moved in intersecting planes, and means for applying power to said device to operate said needles.

44. A knot tying device comprising in combination, two shafts, a needle carried by each shaft, means operatively connecting said shafts, and a guide about which one of said threads may be wrapped prior to the needle manipulation thereof, and through which guide one of the needles moves in operation.

45. A knot tying device comprising in combination, two shafts, a needle carried by each shaft, means to operate said shafts, and interconnecting means therebetween to move said needles in intersecting planes, and a guide about which one of the threads may be wrapped prior to the needle manipulation thereof and through which guide one of the needles moves in operation.

46. A knot tying device comprising in combination, two needles, shafts carrying said needles and having interconnecting gearing to move said needles, supporting means for two threads, and means whereby a bight may be formed in one of the threads, said gearing being constructed and arranged to move said needles toward each other, and to move one of said needles alongside said bight to engage the thread wherein said bight is formed.

47. A knot tying device comprising two knot tying instrumentalities, shafts carrying said instrumentalities and having interconnecting gearing to move said instrumentalities, supporting means for two threads, and means whereby a bight may be formed in one of the threads, said gearing being constructed and arranged to operate said instrumentalities and to move one of said instrumentalities alongside said bight to engage the thread wherein the bight is formed.

48. A knot tying device comprising two knot tying instrumentalities, supporting means for two threads, means whereby a bight may be formed in one of the threads, and means to operate said instrumentalities including means to move one of said instrumentalities alongside said bight to engage the thread wherein the bight is formed, and to move the other instrumentality through said bight to engage the other thread.

49. A knot tying device comprising two knot tying instrumentalities, shafts supporting said instrumentalities and having interconnecting gearing, supporting means for two threads, means whereby a bight may be formed in one of said threads, and means including said shafts and gearing to operate said instrumentalities to tie said two threads into a weaver's knot including means to move one of said instrumentalities alongside said bight to engage the thread wherein the bight is formed.

50. A knot tying device comprising two knot tying needles, supporting shafts therefor having interconnecting beveled gearing, supporting means for two threads, means whereby a bight may be formed in one of the threads, and means including said shafts and gearing to operate said needles including means to move one of said needles alongside said bight to engage the thread wherein the bight is formed.

51. A knot tying device comprising two knot tying needles, supporting means for two threads, means whereby a bight may be formed in one of the threads, and means to operate said needles including means to move one of said needles alongside said bight to engage the thread wherein the bight is formed, and to move the other needle through said bight to engage the other thread.

52. A knot tying device comprising two knot tying needles, supporting means for two threads, a guide about which one of the threads is manually wrapped in a bight prior to needle manipulation of the threads, and means to operate said needles including means to move one of said needles alongside said bight to engage the thread wherein the bight is formed.

53. A knot tying device comprising two knot tying needles, supporting means for two threads, a guide about which one of the threads is manually wrapped in a bight prior to needle manipulation of said threads, and means to operate said needles including means to move one of said needles alongside said bight to engage one of the threads and to move the other needle through said bight to engage the other thread.

54. A knot tying device comprising two knot tying instrumentalities, supporting means for two threads, a guide about which one of the threads is manually wrapped in a bight prior to the operation of the threads by said instrumentalities, and means to operate said instrumentalities including means to move one of said instrumentalities alongside said bight to engage one of said threads and to move the other of said instrumentalities through said bight to engage the other thread.

55. A knot tying device comprising in combination, two shafts, a needle carried by each shaft, means upon one of said shafts to apply power directly to said shaft, said means constituting the initial power receiving member to which power is directly and initially applied, interconnecting means between said shafts, and a guide about which one of the threads may be wrapped prior to the needle manipulation thereof, and with which said needles effect in operation the formation of a weaver's knot.

56. A knot tying device comprising in combination, two shafts, a needle carried by each shaft, means upon one of said shafts to apply power directly to said shafts, said means constituting the initial power receiving member to which power is directly and initially applied, and a guide about which one of the threads may be wrapped in a bight prior to the needle manipulation thereof and alongside which bight one of said needles moves in operation and through which bight the other of said needles moves in operation whereby the needles effect in operation the formation of a knot.

57. A knot tying device composed of two shafts mounted for rocking movement, a needle carried by each of said shafts, interconnecting means between said shafts to rock said needles toward each other in intersecting planes, a housing inclosing said shafts, needles and interconnecting means, and a guide about which one of the threads is wrapped manually prior to needle manipulation thereof.

58. A knot tying device comprising in combination, a casing or housing, two needles, means to support said needles in said housing, interconnecting means between said needles, said needles being mounted within the casing and extending therethrough to the upper face of the casing and so positioned that upon actuation of said shafts the needles are guidingly moved on the upper face of the casing or housing and therefore effect the tying of the knot.

59. A knot tying device comprising in combination, a support for two threads, two shafts, interconnecting means therefor, a needle carried by each shaft, a guide about which one of the threads is wrapped in a bight prior to thread manipulation, and means to operate said shafts to cause said needles to cross each other in operation and including means to cause one of said needles to move alongside said bight and to take the thread wherein the bight is formed and to cause said needles to tie a knot in close proximity to said guide.

In testimony whereof, I have signed my name to this specification.

ARTEMAS B. EDMANDS.